United States Patent [19]

Brenner et al.

[11] 4,118,647
[45] Oct. 3, 1978

[54] PREASSEMBLEABLE BRUSH ASSEMBLY

[75] Inventors: Robert A. Brenner, St. Joseph; Victor W. Cuthbert, Sodus; Albert T. Braga, Stevensville, all of Mich.

[73] Assignee: Whirlpool Corporation, Benton Harbor, Mich.

[21] Appl. No.: 781,011

[22] Filed: Mar. 24, 1977

[51] Int. Cl.² .......................................... H02K 13/00
[52] U.S. Cl. .................................................. 310/239
[58] Field of Search ............. 310/239, 71, 240, 242, 310/241, 238, 245, 247, 249

[56] References Cited

U.S. PATENT DOCUMENTS

| | | | |
|---|---|---|---|
| 2,883,567 | 4/1959 | Schneider | 310/239 |
| 3,187,214 | 6/1965 | Brezosky | 310/239 |
| 3,259,770 | 6/1966 | Mattson | 310/239 |
| 3,842,302 | 10/1974 | Apostoleris | 310/242 |
| 3,967,148 | 6/1976 | Walsh | 310/239 |

FOREIGN PATENT DOCUMENTS 1,613,207  6/1970  Fed. Rep. of Germany ........... 310/239

Primary Examiner—R. Skudy
Attorney, Agent, or Firm—Wegner, Stellman, McCord, Wiles & Wood

[57] ABSTRACT

An improved brush assembly for use in an electrical device having a wall spaced from a current-carrying element. The brush assembly includes a holder having a first portion and an opposite second portion with a through channel opening at its opposite end through the holder portions. A terminal is mounted to the brush holder to have a turned end thereof received in the channel. Tangs are formed integrally with the terminal end for locking the terminal to the brush holder. The locking action is preselected to resist displacement of the terminal from the brush holder notwithstanding application of biasing spring force against the terminal by the spring provided for urging the brush into electrical contact with the current-carrying element of the device. Resultingly, the brush assembly may be preassembled and inserted to between the spaced wall and current-carrying element whereby the base portion of the terminal may be captured between the brush holder and the wall to further retain the terminal in position on the brush holder in the assembled electrical device.

9 Claims, 5 Drawing Figures

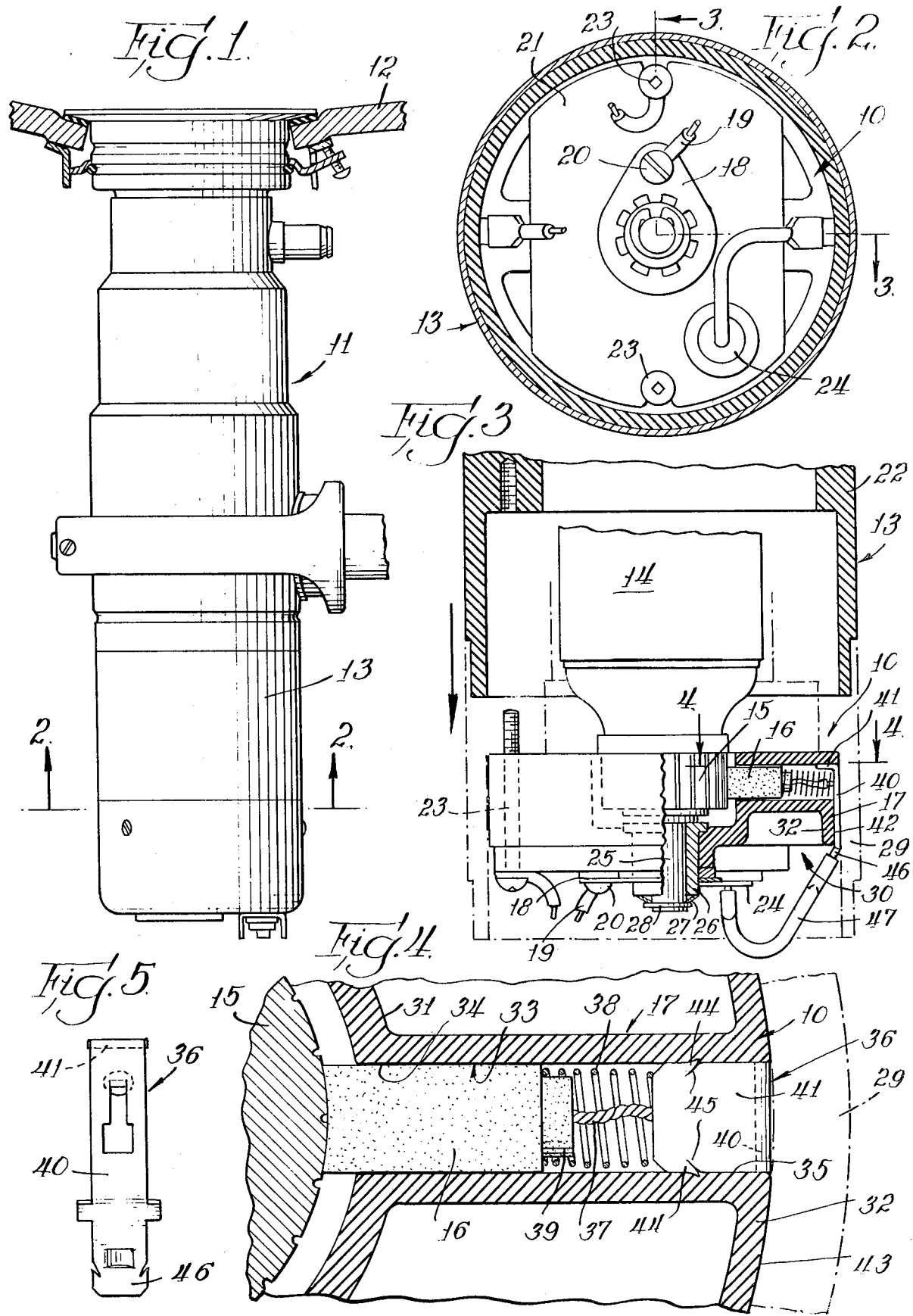

PREASSEMBLEABLE BRUSH ASSEMBLY

BACKGROUND OF THE INVENTION

1. Field of the Invention

This invention relates to electrical connectors and in particular to brush assemblies.

2. Description of the Prior Art

In one form of electrical device comprising an electrical motor provided with a commutator, electrical current is delivered to the commutator by means of brushes slidably engaging the commutator as it is rotated with the motor armature. It is conventional to bias the brushes against the commutator with a preselected force to assure good electrical connection therebetween. The brushes are conventionally mounted in brush holders in such a way as to permit an exposed outer end of the brush to project from the holder into engagement with the commutator.

The brush is conventionally connected to a terminal permitting electrical connection to be made through the terminal to the brush and thusly to the commutator and motor armature.

A number of different brush holders have been developed for use in connection with such commutator-brush electrical devices. Illustratively, Emmor V. Schneider, in U.S. Pat. No. 2,883,567, shows a brush holder structure wherein the spring is retained by a turned tab on a tubular holder received in a cylindrical bore in the housing.

Allen H. Kent, in U.S. Pat. No. 2,894,156, shows a miniature motor wherein the brushes are received in a housing portion with the springs being retained between the brushes and a turned end of the terminal overlying the outer end of the passage in which the brushes are carried.

In U.S. Pat. No. 2,987,639 of Frank K. Bayless et al, a motor brush assembly is disclosed wherein the brush is received in a tubular housing inserted in a complementary bore of an insulated bushing. The bushing projects outwardly from the housing with the outer end of the housing being exposed.

Bernard J. Brezosky, in U.S. Pat. No. 3,187,214, shows a brush retaining means including a plug member of resilient material positioned in the brush opening behind the terminal plate with the plug being held in place by a push-in retainer that is wedged into the opening to have tight fitting engagement with the inner walls thereof. The retainer compresses the plug solidly within the opening so that the terminal plate is in good electrical contact with the conductive means and the brush opening is further sealed against the entrance of moisture by the plug.

In U.S. Pat. No. 3,735,172 of Patrick A. Battaglia et al, a motor brush holder is disclosed wherein the platic housing is provided with a bore receiving the brush and spring. A terminal clip is secured at the outer end of the housing in contact with the spring and a plastic cover is provided about the assembly for shielding the terminal clip and the connected wire. The ends of the clip are provided with turned arcuate portions engaging the periphery of the brush holder sleeve, and more specifically, engage gears on the sleeve to lock the terminal to the holder.

SUMMARY OF THE INVENTION

The present invention comprehends an improved brush holder for use in an electrical device wherein a wall is spaced adjacent a current-carrying element permitting the brush holder to be inserted therebetween.

The brush holder includes a first portion, an opposite second portion, and a through channel opening at its end through the first and second portions. The associated terminal includes a base portion facially overlying the second portion of the brush holder and a turned end portion which is received in the other end of the channel.

Locking means are provided on the terminal turned end for engaging the brush holder within the channel to lock the terminal to the brush holder against displacement of the turned end outwardly from the channel.

Upon insertion of the brush assembly into the space between the wall and current-carrying elements of the electrical device, the base portion of the terminal is captured between the wall and outer surface of the brush holder to further retain the terminal against displacement from the channel in the electrical device.

In the illustrated embodiment, the locking means comprises biting tang means formed integrally in the turned end portion of the terminal.

The brush holder second portion may define a recess for receiving the terminal base portion and in the illustrated embodiment, the recess is arranged so as to cause the base portion to be substantially flush with the outer surface of the brush holder second portion.

In the illustrated embodiment, a pair of biting elements are formed in the terminal end portion.

In the illustrated embodiment, the wall comprises a portion of the motor housing and is formed of a dielectric material.

Thus, the present invention comprehends a means for providing an electrical connection to a current-carrying element of an electrical device which is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of an electrical device illustratively comprising a food waste disposer having an electric motor provided with a brush assembly embodying the invention;

FIG. 2 is an enlarged transverse section taken substantially along the line 2—2 of FIG. 1;

FIG. 3 is a fragmentary vertical section taken substantially along the line 3—3 of FIG. 2;

FIG. 4 is a fragmentary further enlarged transverse section taken subtantially along the line 4—4 of FIG. 3; and FIG. 5 is an enlarged elevation of the terminal of the brush assembly.

DESCRIPTION OF THE PREFERRED EMBODIMENT

In the exemplary embodiment of the invention as disclosed in the drawing, an improved brush assembly generally designated 10 is illustrated in connection with use thereof with an electrical device generally designated 11, which, as shown in FIG. 1 of the drawing, may comprise a food waste disposer adapted to be mounted in a sink top 12. The disposer includes an electrical motor 13 having an armature 14 provided at one end with a commutator, i.e. a current-carrying element, 15 for providing electrical current to the armature.

Electrical current is delivered to the armature from a brush 16 movably carried in a brush holder 17 of the brush assembly 10. In the illustrated embodiment, as shown in FIG. 2, a pair of brushes 16 is provided at opposite sides of the commutator, each of the brushes and related assemblies being similar. As further shown in FIG. 2, the motor may be provided with a ground clip 18 to which a grounding wire 19 is electrically connected by means of a wire screw 20.

The base of the motor may include a heat sink plate 21 secured to the motor body 22 by a pair of mounting screws 23. Carried on the heat sink plate 21 is a diode 24.

The motor shaft 25 is journaled in a bearing 26 carried by the brush holder 17 which, in turn, is retained relative to the shaft 25 by a spring clip 27 and retainer ring 28.

The motor body includes an outer housing wall 29 spaced outwardly of the commutator 15. Wall 29 may be formed of a dielectric material. As shown in FIG. 3, the brush assembly 10 is inserted in the space generally designated 30 between the wall 29 and commutator 15. As shown, brush holder 17 is fixedly secured to the disposer housing by the mounting screws 23.

Referring now more specifically to FIG. 4, the brush holder 17 defines a first, inner portion 31 and a second, outer portion 32. A through bore, or channel, 33 is provided in the brush holder opening at its inner end 34 through portion 31 and at its outer end 35 through portion 32.

A terminal 36 is electrically connected to brush 16 by a pigtail flexible conductor 37. A coil spring 38 is compressively retained between terminal 36 and brush 16 to bias the brush against the commutator 15, as illustrated in FIG. 4. As shown in FIG. 4, the brush may be provided with an annular outer projecting portion 39 serving as a spring retainer for the inner end of the spring.

Terminal 36 includes a base portion 40 and a turned end portion 41. End portion 41 projects inwardly into outer end 35 of the channel 33 and base portion 40 is received in a recess 42 opening outwardly in the outer portion 32 of the brush holder. Recess 42 is preselected to cause the terminal base portion 40 to be substantially flush with the outer surface 43 of the brush holder outer portion 32.

As further shown in FIG. 4, the turned end 41 of the terminal is provided with an integral tang, or barb, 44 defining a locking means for effectively retaining the terminal end portion 41 within the channel prior to the installation of the brush assembly in space 30. Thus, the locking means 44 comprises a barb formed integrally in said terminal turned end 41 engaging the brush holder 17 in the assembly 10. In the illustrated embodiment, a pair of such tangs 44 is provided one at each side of the terminal end 41. The tangs are defined by slits 45 provided in the terminal portion 41 and effectively define resilient locking elements, i.e. resiliently deformed portions of the terminal turned end 41, adapted to bite into the wall of brush holder 17 defining the channel 33.

Thus, the brush assembly 10 may be maintained in preassembled relationship with each terminal being effectively retained in association with the brush holder prior to the installation of the assembly in the electrical device. Upon insertion of the assembly 10 into the space 30, wall 29 of the motor body overlies the base portion 40 of each terminal 36 so as to further effectively retain the terminal in association with the brush holder and prevent withdrawal of the terminal portion 41 from channel 33.

As best seen in FIG. 3, the base portion 40 extends to a lower distal end 46 spaced below the brush holder portion 32 for electrical connection thereto of the desired wire lead, such as lead 47.

In the illustrated embodiment, the brush holder 17 comprises a molded synthetic resin member. The invention comprehends the provision of cooperating means on the terminal and brush holder portions of the assembly 10 for maintaining a preassembled arrangement of the device prior to its installation in the motor. The brush holder is further arranged so as to permit the motor housing wall to automatically provide further retention of the brush assembly in the assembled relationship upon installation thereof in the motor.

The foregoing disclosure of specific embodiments is illustrative of the broad inventive concepts comprehended by the invention.

The embodiments of the invention in which an exclusive property or privilege is claimed are defined as follows:

1. In an electrical device having a wall spaced from a current-carrying element, improved means for providing an electrical connection to the current-carrying element comprising:

a brush holder carried by said wall and having a first portion, an opposite second portion, and a through channel opening at one end through said first portion and at the other end through said second portion;

a terminal having a base portion facially overlying said second portion, and a turned end received in said other end of the channel;

a pair of tangs one each on opposite sides of said terminal turned end defining resilient means for free insertion of said turned end into said channel and for biting into said brush holder as an incident of the inserted turned end being urged outwardly relative to said brush holder channel for locking said terminal end to said brush holder against displacement outwardly from said other channel end, said tangs being resiliently deformed inwardly during insertion of the turned end into said brush holder for free insertion thereof;

an electrically conductive brush movable carried in said one end of the channel and having an end portion projecting from said brush holder first portion; and spring means between said terminal and brush urging said brush outwardly from said one end of the channel into engagement with said current-carrying element, said brush being electrically conductively connected to said terminal, said pair of tangs preventing said outward displacement of the terminal notwithstanding the outward biasing action of said spring means, said assembly of said brush holder, brush, terminal, and spring means being inserted between said wall and current-carrying element with said brush urged against the current-carrying element by said spring means.

2. The electrical device of claim 1 wherein a pigtail flexible conductor electrically interconnects said brush and terminal.

3. The electrical device of claim 1 wherein said brush holder second portion defines a recess receiving said terminal base portion.

4. The electrical device of claim 1 wherein said brush holder second portion defines a recess receiving said terminal base portion with said base portion substantially flush with the outer surface of said brush holder second portion.

5. The electrical device of claim 1 wherein said tangs define resiliently deformed portions of said terminal turned end.

6. The electrical device of claim 1 wherein said tangs comprise a pair of opposed tangs.

7. The electrical device of claim 1 wherein said wall is formed of a dielectric material.

8. The electrical device of claim 1 wherein said tangs are defined by slits formed integrally in said terminal turned end.

9. The electrical device of claim 1 wherein said terminal hose portion is captured between said wall and said brush holder second portion to further retain the terminal against displacement from said other channel end in the electrical device.

* * * * *